Jan. 1, 1924

C. W. SWANSON

POWER TRANSMITTING MECHANISM

Filed March 29, 1920

Inventor:
Carl W. Swanson
By Jones Rain Hinkle
Attys.

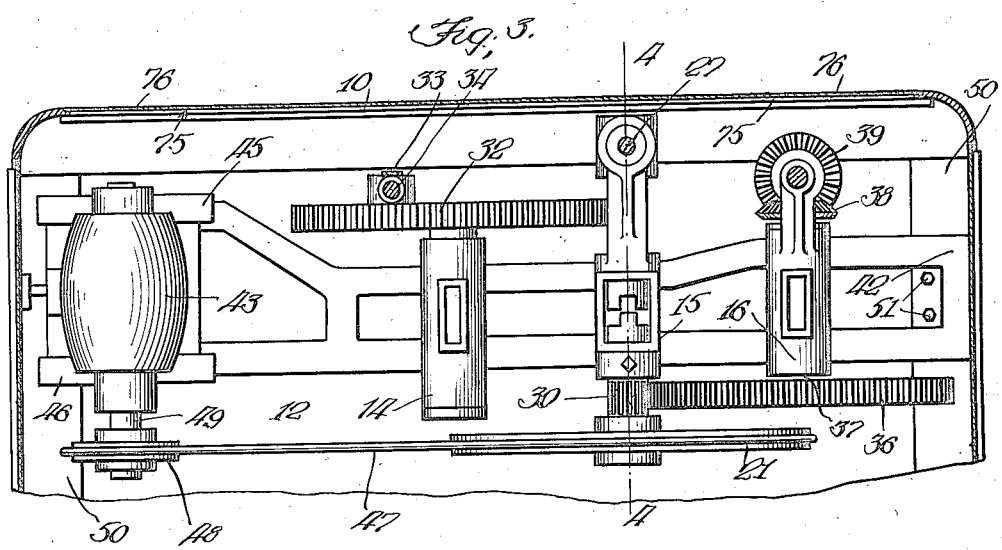
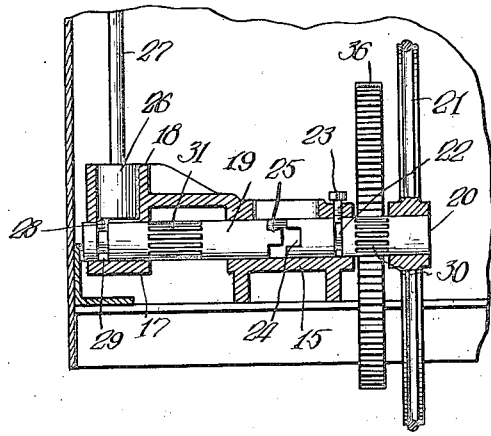
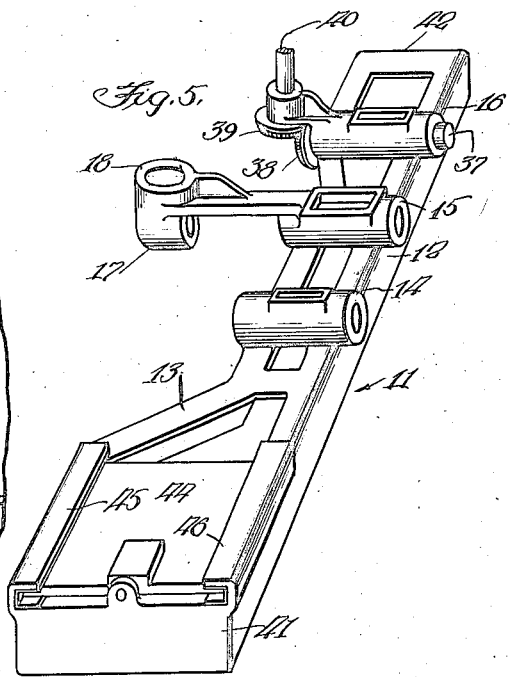

Patented Jan. 1, 1924.

1,479,114

UNITED STATES PATENT OFFICE.

CARL W. SWANSON, OF CHICAGO, ILLINOIS, ASSIGNOR TO APEX APPLIANCE COMPANY, OF CHICAGO, ILLINOIS, A CORPORATION OF ILLINOIS.

POWER-TRANSMITTING MECHANISM.

Application filed March 29, 1920. Serial No. 369,544.

*To all whom it may concern:*

Be it known that I, CARL W. SWANSON, a citizen of the United States, residing at Chicago, in the county of Cook and State of Illinois, have invented certain new and useful Improvements in Power-Transmitting Mechanisms, of which the following is a specification.

This invention relates to improvements in power transmitting mechanisms.

One of the objects of the invention is to provide a power transmitting mechanism especially adapted for transmitting power to a constantly rotatable member and an oscillatable member, such for example, as a wringer and a tub, respectively, of a laundry machine.

One of the especial objects of the invention is to improve the gearing mechanism to render it more durable and more efficient and to cheapen its cost of production.

Another object is to improve the clutch mechanism used to connect and disconnect the oscillating element from the source of power.

Another object is to provide a support for the transmitting mechanism; controlling means therefor; a source of power and a member to be oscillated, all covered by and included within an especially improved housing or casing.

Another object is to provide a clutch controlling means extending thru the casing to the top thereof, for disconnecting the power from the oscillatable member and for causing the member to be stopped.

Another object is to provide a disconnecting clutch by transversely dividing the main power shaft into two members and the provision of engaging means at the approximate ends of such shaft members whereby said members may be disengaged by axially moving one member away from the other member.

Another and more specific object of the invention is to provide an improved and simple means for moving one of the shaft clutch members axially out of and into engagement with the other shaft member.

Other, further and more specific objects of the invention will become readily apparent, to persons skilled in the art, from a consideration of the following description, when taken in conjunction with the drawings, wherein:—

Fig. 3 is a section taken on line 3—3 of Fig. 1.

Fig. 4 is a section taken on line 4—4 of Fig. 3.

Fig. 5 is an isometric perspective view of the base plate upon which the motor and power transmitting gearing is mounted within the casing.

In all the views the same reference characters are employed to indicate similar parts.

Figure 1:
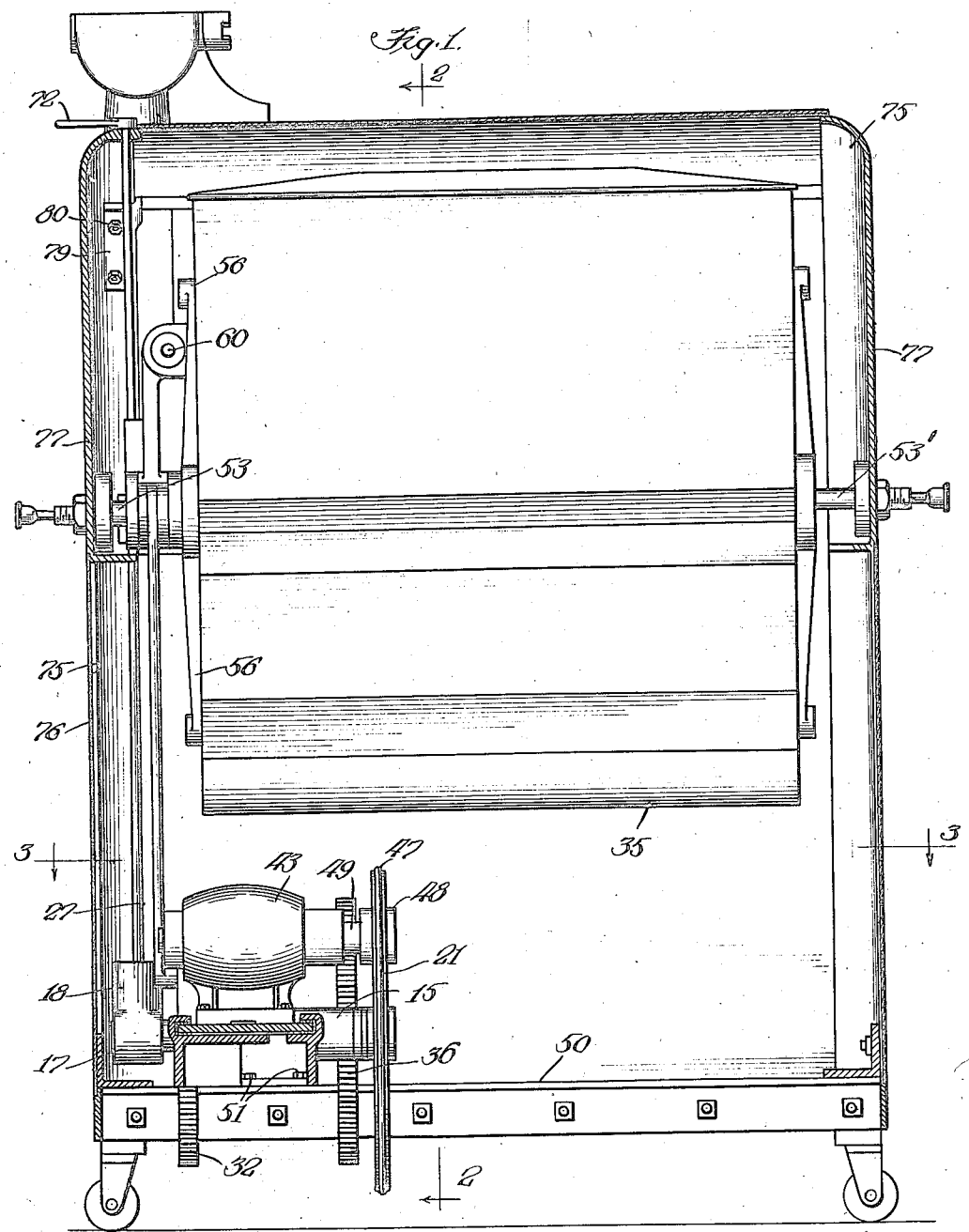
Fig. 1 shows a central section thru an enclosing casing with the power transmitting gearing, the source of power and the oscillatable member therein.
Figure 2:
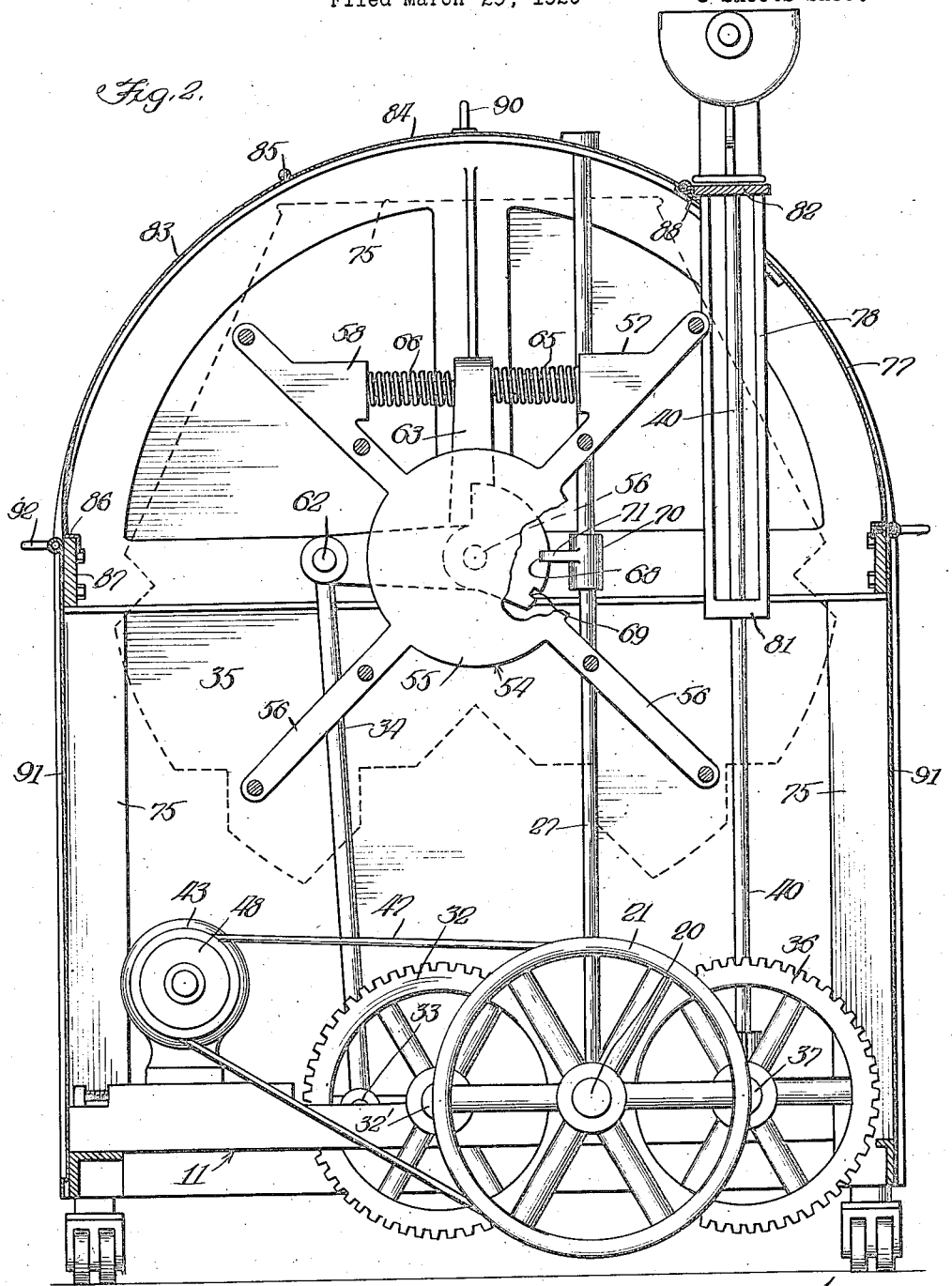
Fig. 2 is a transverse section, taken on line 2—2 of Fig. 1.

The power transmitting mechanism including the motor is a separate unit mounted on a rectangular frame at the bottom of the casing 10 and contained upon a casting 11. The base frame or casting 11, with the source of power, or motor and the transmitting mechanism thereon, is a separate and distinct unit that may be bodily removed from the casing. The base casting 11 for the power unit, consists of the straight side member 12 and the more or less deflected member 13. The two side members are connected together by bearing hubs 14, 15 and 16. The hub 15 has an outer spaced apart bearing 17 and a vertical hollow hub 18. The main driving shaft is transversely divided into two sections 19 and 20 that pass thru the hubs 17 and 15. The constantly rotatable shaft member 20 supports, on its outer end, a band wheel 21 and it is provided with an annular groove 22 within which projects a screw 23, to prevent axial movement of the shaft member 20. On the inner end of the shaft member 20 is a slot 24 forming a clutch member which cooperates with a tongue forming a clutch member for the shaft member 19. The tongue 25 is received in slot 24, when shaft member 19 is moved axially toward shaft member 20, so that shaft member 20 will positively rotate the member 19, when these two clutch members are connected together.

Rotatable in the hub 18 is a lug 26, secured to the end of the vertical rod 27, which has a projection 28 contained in the circular groove 29, in the shaft member 19. When the rod 27 is manually rotated, the projection 28 moves the shaft member 19 into connection with the shaft member 20, thereby connecting the clutch parts 24 and 25 together so that the shaft 19 will be positively rotated by the shaft 20. The shaft members 19 and 20 are, preferably, of uniform diameter and in the surface of the member 20, there is cut a geared pinion 30, while in the member 19 is a similar, but somewhat longer pinion 31. A gear wheel 32 is in mesh with the pinion 31 and it is secured to the shaft 32' that is rotatable in and supported by the bearing hub 14. The gear wheel 32 carries a crank pin 33 upon which is supported the connecting rod 34. The connecting rod 34 is suitably connected to an oscillatable member 35, which may be a tub of a washing machine, or other such device. The pinion 30 is in mesh with the gear wheel 36 that is supported on the shaft 37 that passes thru the hub 16. On the other end of the shaft 37 is a miter gear 38, which is in mesh with another miter gear 39, supported on the lower end of the vertical shaft 40, which is adapted to be constantly rotated by the shaft member 20. By this arrangement the vertical shaft 40 will be rotated constantly whether the shaft member 19 is connected to the shaft member 20 or not, and therefore the means for operating the oscillatable member may be disconnected from the power mechanism without affecting the operation of the rotatable vertical shaft 40.

The end 41, of the frame 11, is wider than the end 42, or intermediate parts, for supporting an electric motor 43. The motor 43 is secured to a slidable plate 44 contained between ways afforded by the overlapping parts 45 and 46 so that the plate 44 may be slid along the ways for the purpose of tightening the belt 47, which connects the motor to the band wheel 21. A relatively small grooved pulley 48, is fixed to the end of the shaft 49, of the motor, for that purpose.

In the lower part of the casing 10, there are several horizontal members 50, forming a rectangular frame to which the ends 41 and 42 of the base casting 11 are connected, as by screws 51.

Tub 35 is oscillatable on a horizontal axis. Opposite sides of the tub have trunnions 53 and 53' secured thereto. Trunnion 53 forms a part of a spider 54 having a central disc 55, and four arms 56. On the two upper arms 56 are projections 57 and 58, having disc-like parts 59 between which is passed a bolt 60. Journaled on trunnion 53 is an arm 61 to which the connecting rod 34 is movably secured as at 62, and an arm 63 is fixed to the arm 61 thru which the bolt 60 passes. Between the discs 59 and the arm 63 are springs 65 and 66, one on either side of the arm 63. These are open helical springs that normally keep the arm 63 in intermediate vertical position. The springs also serve to bring the device to be oscillated, to the position in which the arm 63 is positively stopped or, in other words, the device to be oscillated will be brought into position, dependent upon the position of the arm 63, by the operation of the counter acting springs 65 and 66. Fixed to the arms 61 and 63 is the quadrant 67 in the face of which is a notch 68 and another notch 69. Fastened on the rotatable rod 27 is a hub 70, having a blade-like projection 71, to be received in one of the notches 68 or 69, for the purpose of holding the device to be oscillated in either position dependent upon the notch in which the blade 71 is included. When the rod 27 is rotated by means of a handle 72 at the upper end of the casing 10, the part 26 carrying the projection 28, moves the shaft member 19 axially out of driving engagement with the shaft member 20, after which, upon further movement of the handle 72, the blade 71 is caused to enter one of the notches, 68 or 69, thus stopping the arm 63, where upon the springs 65 and 66 will finally stop movement of the tub 35.

Casing 10 has two arched skeleton end frames 75 between and to which sheet metal side walls 76 are secured. End frames 75 carry suitable bearings of the usual type for supporting trunnions 53 and 53'. A rear cover section 77 is supported between end frames 75. To one of the members 75, an elongated casting 78 is secured, as at 79, by bolts and nuts 80. The casting provides a lower bearing 81 and an upper bearing 82 for the vertical shaft 40.

A removable door, consisting of two sections 83 and 84 hinged together at 85, is provided to close the top of the casing. The lower edge of section 83 is offset to provide a shoulder 86 which rests on a transverse frame member 87 to support one side of the cover. The offset edge of section 83 lies behind frame member 87 to provide a relatively tightly closed joint when the door is closed. The outer edge of section 84 has an offset flange 88 which forms a shoulder for abutting a bead along the upper edge of cover section 77. A cover opening handle 90 is carried by cover section 84. Both cover sections 83 and 84 may be pivotally moved on the shoulder formed by flange 88 to open the casing or the two sections may be bodily removed. Side walls 91, on each side of the casing, are each provided with a handle 92 for vertically sliding the side walls into raised position to render the internal mechanism accessible for repairs, adjustment and attention. The side walls 91 may be entirely lifted from their supports, because end frames 75 are somewhat narrower at the top as at 93, to permit the walls 91 to be taken from the casing.

All of the described mechanism, except means for controlling it, is entirely and completely enclosed within the casing out of sight and protected from injury by the casing.

Another feature of the construction is that the oscillatable member 35 occupies practically all of the space within the casing because of the fact that the power unit is located below it.

Having described my invention what I claim as new and desire to secure by Letters Patent is:—

1. A power transmitting mechanism having a power shaft divided transversely into two aligning members, one of which is axially movable; a gear on the axially fixed aligning member; an elongated pinion on the axially movable member near the mid portion thereof; a bearing at each end of the axially movable member within which said member is movable; clutch members at adjacent ends of the two shaft members and means substantially enclosing the clutch members.

2. A washing machine having an enclosing casing with a supporting framework near its bottom, a base supported by the framework, said base having a divided bearing, a motor supported on the base, a shaft supported in the divided bearing and transversely divided into a driving member and an axially movable driven member, means housed within a portion of the divided bearing for moving the driven member axially toward and from the driving member, clutch elements on the adjacent ends of said members to connect the same together when the driven shaft member is moved toward the driving shaft member and a movable tub associated with and operated by the driven shaft member.

3. A power transmitting mechanism having in cooperative association a shaft of substantially uniform diameter, divided transversely into two shaft members, one member axially movable towards the other, each member having an integral gear pinion cut in its surface and having integral clutch members on adjacent ends; means to axially move one member into and out of rotatable engagement with the other member and a gear wheel connected to each shaft member.

4. A power transmitting mechanism having in cooperative association a shaft of substantially uniform diameter, divided transversely into two members, one member axially movable towards the other, each member having an integral gear pinion cut in its surface and having an integral clutch member on adjoining ends; means to axially move one member into and out of rotatable engagement with the other member; a gear wheel connected to each shaft member; a rotatable device connected to one gear wheel and an oscillatable device connected to the other gear wheel.

5. A power transmitting mechanism having in cooperative association a shaft of substantially uniform diameter, divided transversely into two members, one member axially movable towards the other, each member having an integral gear pinion cut in its surface and having integral clutch members on adjacent ends; means to axially move one member into and out of rotatable engagement with the other member; two gear wheels, on opposite sides of the composite shaft, one connected to each shaft member; a rotatable device connected to one gear wheel and a crank operated by the other gear wheel, to oscillate an oscillatable device.

In testimony whereof I hereunto subscribe my name.

CARL W. SWANSON.